Sept. 10, 1968  D. C. PEARL  3,400,861

DRY PRODUCT STORING AND DISPENSING APPARATUS

Filed Jan. 12, 1967  2 Sheets-Sheet 1

Inventor
DONALD C. PEARL
BY Marvin Chaban
ATTY.

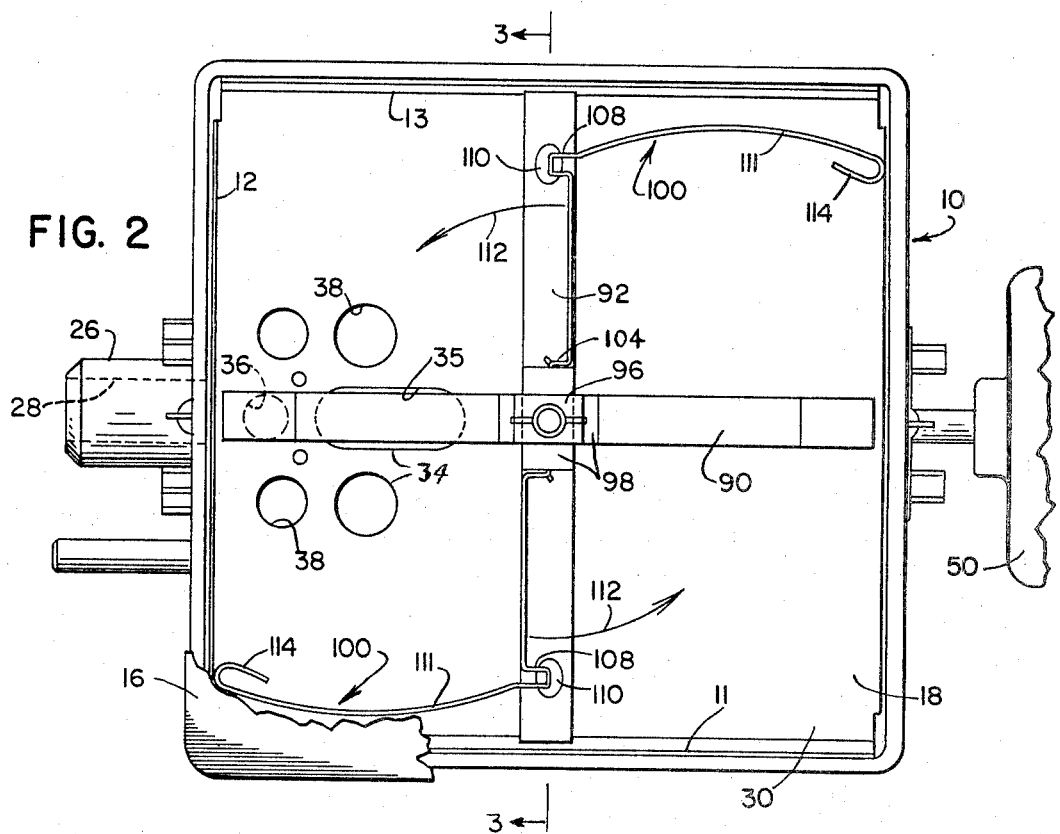
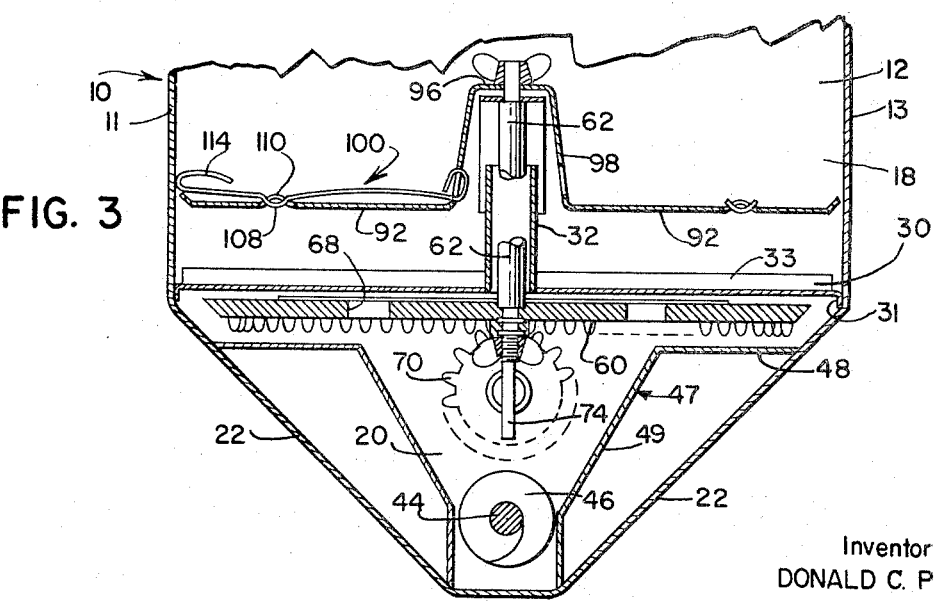

United States Patent Office 3,400,861
Patented Sept. 10, 1968

3,400,861
DRY PRODUCT STORING AND DISPENSING APPARATUS
Donald C. Pearl, Lake Zurich, Ill., assignor to Canteen Corporation, Chicago, Ill., a corporation of Delaware
Filed Jan. 12, 1967, Ser. No. 609,993
3 Claims. (Cl. 222—227)

ABSTRACT OF THE DISCLOSURE

The apparatus is used for dispensing dry products such as granular or powdered material, in controlled amounts from a closed storage hopper by the action of a feed screw or auger. The feed screw is operated for a timed period whenever dispensing is to take place. The feed screw shaft drives a gear train which in turn drives an agitator in the hopper above the feed outlet opening to stir the material being dispensed. The hopper has an internal horizontal wall dividing the feed screw area from a main storage area above. In this main storage, a centrally mounted set of blades and a set of agitating wires are driven by the gear train to loosen the material in storage and to allow the material to flow gravitationally through openings in the divider wall to the feed screw area for subsequent dispensing.

Brief summary of the invention

This invention relates to an apparatus for storing and dispensing dry product such as powdered or granular material, and more particularly to an apparatus for storing material from which metered quantities are dispensed on demand.

In storing quantities of powdered material such as powdered chocolate, soup, cream, tea or coffee (or other dry products such as ground coffee) a major problem occurs if any moisture whatsoever is present in storage area. For example, in vending machines of the type in which the material is dispensed and is mixed with hot water, the use of water in the machine process and the necessity of feeding the powdered material to the water, tend to defeat most efforts to eliminate moisture from the vicinity of the material stored. The problem resulting from the presence of moisture in the storage areas is that the material tends to cake and pack of its own weight and to bridge across areas from which material has been removed. Due to these tendencies, the material cannot be readily kept in a consistent state both as to material density and fluency. With this lack of consistency, the amount of material dispensed cannot be controlled with any degree of precision. Therefore, extra effort must be expended to maintain the material in a fluent state when material is to be dispensed.

The reasons for requiring control in the amount of material dispensed fall into two general categories. The most important reason for requiring control of dispensed material quantity is concerned with the uniformity of the output product, both as to taste and palatability. To provide an output product which is uniform, the ingredient quantities must be uniform, for reasons which are obvious.

As a second reason, it is quite important from an economic standpoint that the quantity of material dispensed be controlled within fairly precise limits in order to control the cost of product sold. To maintain the precision of dispensing control for the reasons enumerated it is imperative that the dispensing area be maintained in a full or practically full state with material of consistent density and fluidity.

Many forms of complex storage structure, agitators and vibrators have been employed to overcome the tendency of the material to cake and bridge. It is to an improved form of storage and agitation apparatus that the present invention is directed.

The invention therefore relates to an improved method of storing, agitating and dispensing a quantity of granular or powdered material from a closed hopper structure. Material is dispensed from an opening in one lower end wall by the action of a feed screw or auger. The main storage area is separated from the feed area or dispensing well by a horizontal divider wall upon which the bulk of the stored material rests. A series of openings in this horizontal wall provides passage for material from the storage area to the dispensing well.

To counteract the tendency of the stored material to cake, pack and adhere to the walls of the hopper, at least two agitating actions are provided. For these agitating actions, the apparatus includes a common gear train driven by a drive gear mounted on a motor driven auger shaft for rotation therewith. The gear train has as one of its outputs, an output gear mounted to an end wall of the dispensing well adjacent the dispensing feed screw opening. This output gear has connected adjacent its periphery the tips of a horizontal inwardly extending U-shaped wire agitator for churning material adjacent the output opening. The gear train includes an intermediate shaft extending through the divider wall to control the rotation of a set of cutting blades positioned above the divider wall. These blades act to feed material to the dispensing well. In addition to the cutting blades, the agitating action in the storage hopper is further enhanced by a set of resilient wire forms each of which extends freely from its mounting to the blades to a point adjacent the hopper walls.

When material is to be dispensed from the mechanism, the feed screw is rotated for a timed period. As the feed screw rotates, it drives the gear train to rotate the output gear and cause the U-shaped agitator to churn through material resting above the feed screw outlet opening, thereby to loosen up caked material and maintain the material in a fluent state. In addition, the cutting blades are rotated to loosen up material resting on the divider wall and augment passage of material to the dispensing well. During this dispensing period, the resilient wire forms rotate with the blades and snap against the hopper walls to vibrate the hopper and further loosen the material in the hopper for consistent dispensing.

Description

FIGURE 2 is a plan view of the hopper of FIGURE 1 with the cover broken away to show the hopper interior; and FIGURE 3 is a side view in section viewed along the line 3—3 of FIGURE 2, with certain of the components shown in partially exploded form.

Figure 1:
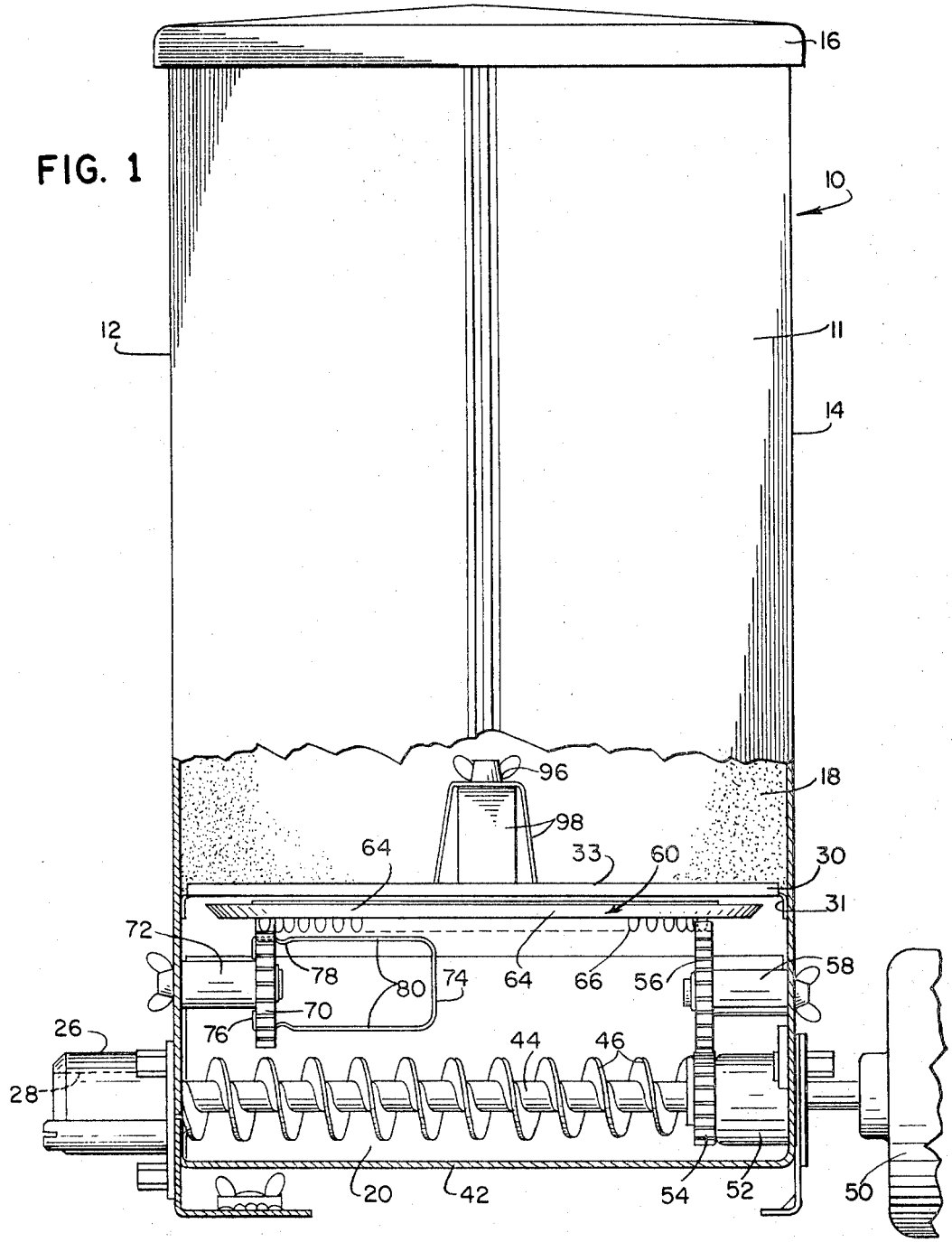
FIGURE 1 is a side elevational view of the hopper of the present invention with parts broken away to show the operative components thereof.

In the drawings there is shown a generally square hopper 10 of regular cross section which preferably may be molded by suitable techniques from a material of high impact transparent styrene or the like. The hopper 10 has upstanding side walls 11, 12, 13 and 14 which terminate in a top or loading opening. The top is normally covered by a cap 16 which may readily be removed for filling the open cavity 18 of the hopper. The hopper may be described generally as a comparatively large volume enclosure suitable for the storage of dry product such as powdered or granular material.

At its lower end the hopper walls 11 and 13 converge to form dispensing well 20 of triangular cross section. This dispensing well encloses the bottom of the hopper and is generally in the form of a triangular prism with tapering walls 22 as converging extensions of walls 11 and 13. Each tapering wall 22 of the dispensing well may be molded as an integral unit with the adjacent upper hopper wall or may be fabricated as a separate unit and attached to the rest of the hopper by suitable means. Adjacent the bottom end of wall 12 in its triangular area and extending through wall 12 there is mounted a dispensing or outlet tube 26 with its circular bore 28 providing an outlet for communication between the interior and exterior of the dispensing well.

Separating the dispensing well from the upper portion of the storage hopper 10 is a horizontal wall 30. Wall 30 has downturned flanges 31 at two sides and an upturned flange 33 at the opposed sides so that the wall may be snugly fitted into the hopper and be held resiliently against the hopper walls. Wall 30 serves as a divider between the hopper storage cavity 18 and the interior of the dispensing well 20, or it may be defined as the floor of the hopper storage cavity 18. The divider wall 30 is generally imperforate and has as its center an upstanding bearing tube 32. Near the edge of wall 30 adjacent end wall 12, the divider wall 30 has a series of spaced openings 34 providing communication between the hopper cavity and the dispensing well 20. These openings are aligned symmetrically about the center line of the divider wall, and include an enlarged oval opening 35 and a circular opening 36 on the center line of the wall, with circular openings 38 symmetrically disposed on either side of the openings 35 and 36.

As mentioned previously within the dispensing well 20 side wall 12 has extending through it tube 26 which provides an outlet opening 28 for dispensing product from the dispensing well 20. The interior surface of outlet opening 28 serves as a bearing surface for one end of the auger or feed screw which is driven by its horizontally extending shaft 44. The feed screw flights 46 are aligned to convey product toward the outlet opening 28 of dispensing tube 26 at a level above the vertex line 42 of the dispensing well. Outwardly of the flights or turns 46 of the feed screw, a set of baffle walls 47 is mounted to channel product passing into the well to the feed screw and its flights 46. The baffle walls 47 rest against the tapering walls 22 and include horizontal top plates 48 joining inwardly and downwardly tapering wall plates 49 which are held on either side of the feed screw flights by any suitable means allowing ready removal of the plates for cleaning, when desired. Optionally, these baffles may be fabricated integrally with the dispensing well. Auger shaft 44 is driven by a conventional electric motor 50. Motor 50 is mounted externally of the dispensing well adjacent end wall 14 and is drivingly connected to a closed gear system 52 which is mounted to end wall 14.

Secured rigidly on the feed screw or auger shaft 44 inwardly of the gearing system 52 is a drive gear 54 which rotates on rotation of the auger shaft. In mesh with drive gear 54 is a coplanar idler gear 56. The idler gear 56 is mounted on a horizontal shaft structure 58 which is affixed to hopper wall 14 above and parallel to the auger shaft, to allow the idler gear to rotate relative to the stationary wall. Meshing with the idler gear 56 is a crown gear 60 which is mounted below and parallel to the divider wall, and rotatable relative to the divider wall 30. The crown gear has an axial shaft 62 upstanding through the central bearing tube 32 in the horizontal divider wall 30, the shaft 62 being rigidly connected to crown gear for rotation therewith. The crown gear is comprised of a disc 64 of large area which rests in a horizontal plane. The disc is perforated regularly through its body with a series of large perforations 68 to allow the gravitational flow of product from the hopper cavity to the dispensing well. Adjacent its periphery on its underside surface the disc 64 has an annulus of downwardly disposed, regularly spaced, teeth 66 which engage the teeth of idler gear 56 for rotation therewith.

Diametrically opposed to the idler gear 56 is an agitator gear 70 which is parallel to and opposite the idler gear 56. This agitator gear is also in mesh with the teeth 66 of crown gear 60, diametrically opposite the position of crown gear mesh with idler 56. The agitator gear is mounted on a horizontal shaft structure 72 which is suitably secured to hopper wall 12 above and parallel to the dispensing tube 26. The mounting of the gear to the shaft structure 72 allows the gear 70 to rotate while the shaft remains stationary. Affixed to the body of agitator gear 70 is a generally U-shaped agitator 74. The agitator 74 shown, is comprised of a length of wire bent in a generally U-shaped form with the legs 80 of the "U" disposed symmetrically about the axis of the agitator gear 70. The connection of the agitator to the gear may be in the simple form as shown, in which the agitator legs 80 extend through suitably sized holes in the gear and are peened over to form the holding tips 76 abutting against the back face of agitator gear 70. Adjacent the opposite or front face of the gear, a slight indentation 78 is formed in each of the legs 80 of the "U" to hold the legs from movement through the gear 70.

Mounted rigidly on the crown gear axial shaft 62, above the divider wall 30, is a series of crossed blades 90 and 92 which are disposed 90° from one another. Each blade has a plateau section 96 resting on the shaft 62 above the axial bearing tube 32 of the divider wall, the plateau section on each blade leading to opposed riser members 98 extending downwardly to a junction from which the horizontal extent or cutting members 94 of the blades continues to points adjacent both opposing hopper walls. Each cutting member 94 of the blades is spaced slightly above the divider wall 30. The blades 90 and 92 are secured by nuts, wing screws or the like on the crown gear axial shaft 62 symmetrically above the bearing tube 32 so that the blades 90 and 92 will rotate on rotation of the crown gear 60.

Connected to the opposed horizontal extent or cutting members 94 of the blade 92 are two generally L-shaped vibrators 100. Each of these vibrators is identical in shape, material and length and each is affixed to a separate leg of the blade 92. Each vibrator has an open hook 104 which fits through a pair of spaced openings in the blade riser member 98 to connect one end of the vibrator to the blade. From the hook, the vibrator extends parallel to the blade 92 along its horizontal extent to an open loop 108 which fits into a suitable embossed opening 110 in the blade near its outer end. From the opening 110, the vibrator has a bent section 111 which extends freely, normally from the blade in a trailing direction when the blades are rotated in the direction indicated by the arrows 112. The bent section 111 terminates in an open hook 114 which normally rests against the adjacent wall of hopper 10. The vibrators are formed of a resilient but relatively stiff wire so that on rotation of the crown gear and the blades, the vibrators will also rotate, imparting a snapping action against the walls of the hopper vibrating such walls.

The operation of the apparatus is as follows:

When dry product is to be stored and dispensed from the apparatus the cover 16 is removed and sufficient product is loaded in the hopper cavity 18. The cover 16 is then restored. The greater part of the product will rest on the divider wall 30 with some of the product passing gravitationally through the opening 34 in the divider wall and through the openings 68 in the crown gear. Since the opening 34 in the stationary divider wall 30 is disposed above the feed end of the dispensing well, this section of the well will receive a considerable amount of product.

When product is to be dispensed, the motor 50 is operated for a controlled length of time, the duration of the period of operation of the motor being controlled in any known manner. On operation of the motor 50, the auger shaft 44 is rotated to drive and feed a quantity of product toward and through outlet opening 28. The amount of product dispensed will be dependent on the duration of operation of the motor and the amount and uniformity of product in the dispensing well adjacent the outlet end.

During the period of rotation of auger shaft 44, the drive gear 54 will be rotated by the rotation of the auger shaft. Drive gear 54 will rotate the idler gear 55 which in turn will rotate the crown gear 60. The crown gear will rotate the agitator gear 70. On rotation of the agitator gear 70, the U-shaped agitator 74 will be rotated about an axis parallel to and intermediately between its legs 80 so that a churning or stirring action is performed on a product resting in the dispensing well 20. In addition, the crown gear and the gear 70 on rotation will tend to stir and loosen any product adjacent thereto.

This stirring action tends to loosen any packed or bridged product in the dispensing well and will stir the product to a somewhat constant density to maintain this density in the product being dispensed. In this way, the amount of product being dispensed can be directly controlled by the duration of the dispensing operation.

Concurrently with this dispensing and agitating, the rotation of crown gear 60 will cause the blades 90 and 92 to rotate in a plane above and parallel to the divider wall. These blades will cut through any packed or dense product resting on the wall and will stir and loosen the product sufficiently to allow it to pass gravitationally through the divider wall openings 34, 35 and 36 for passage to the dispensing well. The rotation of the blades will also rotate the vibrators 100 to further cut through any material tending to bridge above the divider wall 30. After passing a corner of the hopper, the vibrators will be deflected inwardly by the side wall which it contacts to snap the side wall and vibrate the hopper, further loosening any concentrations of product which may have occurred. This snap action will also inhibit any tendency of the product to bridge and adhere to the hopper walls. As mentioned previously, and as can be seen best in FIGURE 2, these vibrators are disposed approximately 180° apart so that opposed ends of the hopper will be vibrated at any one time to shake the entire hopper.

With the construction set out, the present apparatus provides at least four actions performed concurrently with the rotation of the auger shaft 44. These four actions include: (1) the dispensing action of the auger feed screw flights 46; (2) the agitating action within the dispensing well performed by agitator 74; (3) the cutting and rotative dispensing action of blades 90 and 92 to free product for ready passage from the hopper cavity to the dispensing well; and (4) the vibrating action imparted to the hopper walls and to product in the hopper cavity by the resilient and reflexive movement of vibrators 100.

While there has been described what is thought to be the preferred embodiment of the invention, it will be understood that modifications may be made therein and it is intended to cover by the appended claims all such modifications which fall within the true spirit and scope of the invention.

What is claimed is:
1. A dry product dispensing apparatus with a walled storage hopper having a dispensing well bearing a feed screw therein, in which there is a dispensing opening for emitting product fed by said feed screw, wherein the improvement comprises:
  (a) first agitator means within the dispensing well adjacent said dispensing opening,
    (1) said agitator means operative on rotation of said feed screw to stir product adjacent said dispensing opening to facilitate the dispensing thereof,
  (b) second agitator means in said hopper above the first agitator means, said second agitator means including:
    (1) vibratile means operative on rotation of said feed screw to engage the walls of the hopper to dislodge product adhering thereto,
  (c) in which a storage floor is interposed between said first agitator means and said second agitator means, openings in said floor in the area adjacent the dispensing opening to gravitationally pass material to the dispensing well, said first agitator means whereby to provide a product of consistent density within the dispensing well adjacent said dispensing openings,
  (d) said second agitator means comprises a plurality of cutting members disposed above said floor openings,
  (e) said cutting members are rotated on rotation of said feed screw to loosen product above said floor openings to facilitate the passage of product from above said storage floor to the dispensing well,
  (f) a gear train transmitting the rotation of said feed screw to said first agitating means,
  (g) intermediate means driven by said gear train for rotating said cutting members, and
  (h) in which said vibratile members comprise L-shaped resilient elements mounted on one of said cutting members and rotatively therewith to snap against the hopper walls.

2. A dry product dispensing mechanism comprising:
  (a) a storage hopper including a bottom wall,
  (b) a horizontal feed screw disposed in said well to dispense product from one end thereof,
  (c) means for rotating said feed screw to dispense product from said one end,
the improvement comprising:
  (d) a gear train disposed in said well and driven by said feed screw on rotation thereof,
  (e) a first agitator adjacent the one end of said well and driven by said gear train to loosen and stir the product in said well for dispensing,
  (f) an apertured wall in said hopper dividing the bottom well from a storage area thereabove,
  (g) a drive member extending through said apertured wall,
    (1) said drive member coupled to said gear train for movement therewith, and
  (h) a second agitator disposed in said storage area and movable with said drive member for stirring the product in said storage area to free said product for gravitational movement through said apertured wall to said well for subsequent dispensing.

3. A mechanism as claimed in claim 2, the improvement further comprising:
  (a) a resilient vibrator mounted on said second agitator for movement therewith, and
  (b) said vibrator contacting the walls of said hopper in the storage area on movement of said second agitator to shake said hopper and free product lodged thereagainst.

References Cited
UNITED STATES PATENTS

| | | | |
|---|---|---|---|
| 1,908,882 | 5/1933 | Birkenbedel | 222—238 |
| 2,038,371 | 4/1936 | Lemoine | 222—227 |
| 2,881,555 | 4/1959 | Atkinson et al. | 222—236 XR |
| 3,010,615 | 11/1961 | Smith et al. | 222—227 |
| 3,013,701 | 12/1961 | Joschko | 222—227 |
| 3,064,831 | 11/1962 | Cook | 222—236 XR |
| 3,067,914 | 12/1962 | Ellaby | 222—236 XR |

FOREIGN PATENTS 309,383    7/1917    Germany.

WALTER SOBIN, *Primary Examiner.*